(12) United States Patent
Chew

(10) Patent No.: US 9,384,132 B2
(45) Date of Patent: Jul. 5, 2016

(54) EMULATED MESSAGE SIGNALED INTERRUPTS IN A VIRTUALIZATION ENVIRONMENT

(71) Applicant: Intel Corporation, Santa Clara, CA (US)

(72) Inventor: Yen Hsiang Chew, Georgetown (MY)

(73) Assignee: Intel Corporation, Santa Clara, CA (US)

( * ) Notice: Subject to any disclaimer, the term of this patent is extended or adjusted under 35 U.S.C. 154(b) by 252 days.

(21) Appl. No.: 13/930,108

(22) Filed: Jun. 28, 2013

(65) Prior Publication Data

US 2015/0006783 A1    Jan. 1, 2015

(51) Int. Cl.
*G06F 13/00* (2006.01)
*G06F 13/28* (2006.01)
*G06F 12/08* (2016.01)
*G06F 12/10* (2016.01)

(52) U.S. Cl.
CPC ........ *G06F 12/0815* (2013.01); *G06F 12/0835* (2013.01); *G06F 12/10* (2013.01); *G06F 2212/151* (2013.01); *Y02B 60/1225* (2013.01)

(58) Field of Classification Search
CPC ............ G06F 12/0815; G06F 12/0891; G06F 12/0831
See application file for complete search history.

(56) References Cited

U.S. PATENT DOCUMENTS

2008/0294808 A1\* 11/2008 Mahalingam et al. .......... 710/26
2014/0006668 A1\*  1/2014 Chew ............................ 710/269

\* cited by examiner

*Primary Examiner* — Eric S Cardwell
(74) *Attorney, Agent, or Firm* — Thomas R. Lane

(57) ABSTRACT

A processor with coherency-leveraged support for low latency message signaled interrupt handling includes multiple execution cores and their associated cache memories. A first cache memory associated a first of the execution cores includes a plurality of cache lines. The first cache memory has a cache controller including hardware logic, microcode, or both to identify a first cache line as an interrupt reserved cache line and map the first cache line to a host physical memory address translated from a guest physical memory address in the address space of a virtual machine to which an I/O device has been assigned. The controller may set a coherency state of the first cache line to shared and, in response to detecting an I/O transaction including I/O data from the I/O device and containing a reference to the host physical memory address, emulate a first message signaled interrupt identifying the host physical memory address.

26 Claims, 9 Drawing Sheets

US 9,384,132 B2

EMULATED MESSAGE SIGNALED INTERRUPTS IN A VIRTUALIZATION ENVIRONMENT

FIELD

Disclosed subject matter relates to microprocessor systems and, more particularly, microprocessor systems employing message signaled interrupts and virtualization.

BACKGROUND

A message signaled interrupt (MSI) enables an input/output (I/O) device, sometimes also referred to herein as a peripheral device, or a requesting agent, in a microprocessor based system to request service. Historically, I/O devices employed dedicated interrupt pins to signal a request for service, but pin-based interrupts are expensive in terms of the number of pins required for chip set devices and in terms of the need to manage interrupt signals that are generated out-of-band with respect to the address, data, and control busses or interconnects between the I/O device and the chip set.

Virtualization allows for the creation of one or more virtual machines (VMs) on a single system. Virtualization architectures typically involve the use of a virtual machine monitor (VMM) software layer that runs at the highest privilege level and has complete ownership of the underlying system hardware. The VMM allows the VMs to share the underlying hardware and yet provides isolation between VMs.

DETAILED DESCRIPTION

Figure 1:
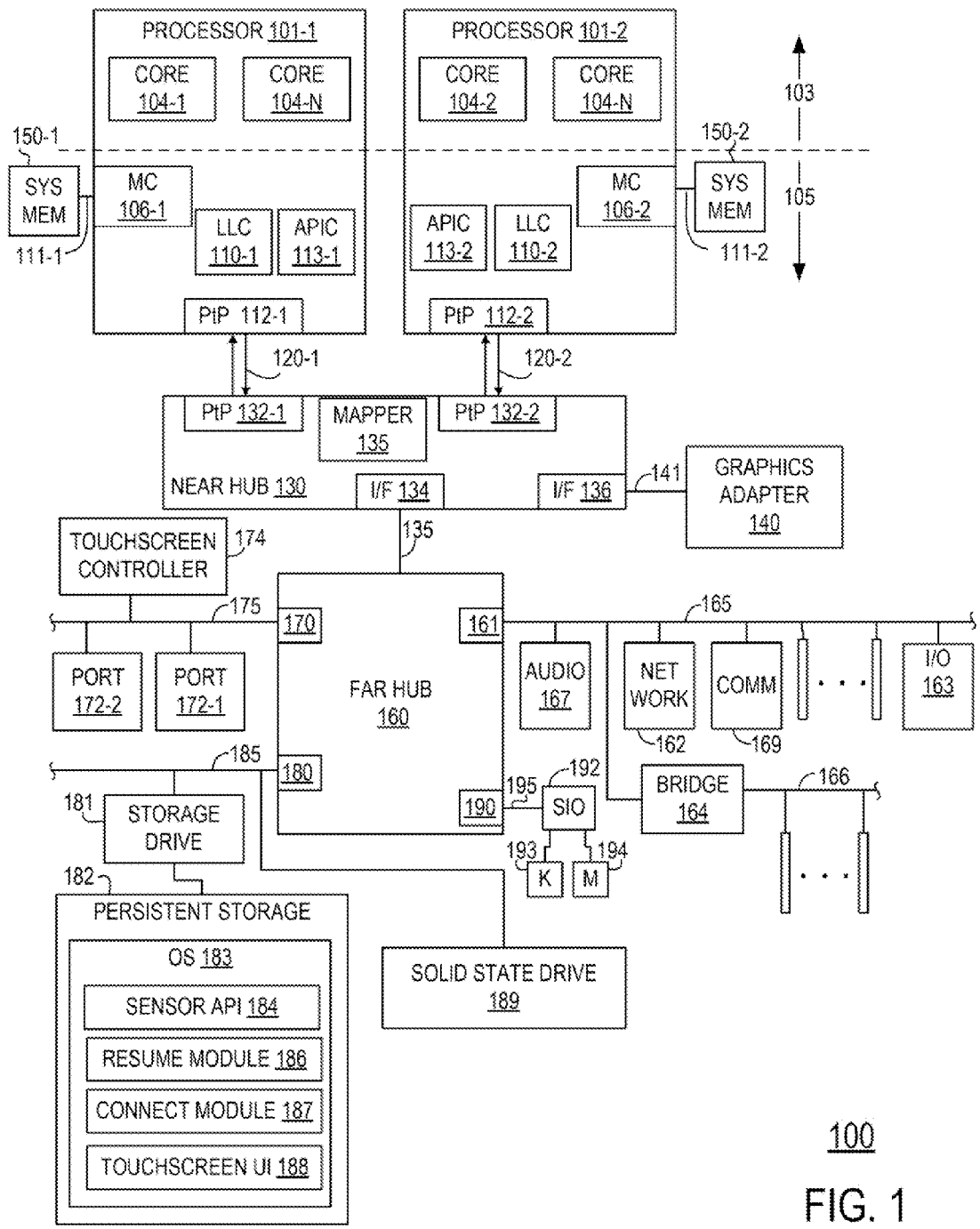
FIG. 1 illustrates a multiprocessor system used in conjunction with at least one embodiment.

In at least one embodiment, a disclosed processor includes multiple execution cores and their associated cache memories and cache controllers. In at least one embodiment, a first cache memory associated a first of the execution cores includes a plurality of cache lines. In at least one embodiment, the first cache memory has a cache controller including hardware logic, microcode, or both to identify a first cache line as an interrupt reserved cache line and map the first cache line to a host physical memory address translated from a guest physical address in the address space of a virtual machine to which an I/O device has been assigned. The controller may set a coherency state of the first cache line to shared and, in response to detecting an input/output (I/O) transaction including I/O data from the I/O device and containing a reference to the host physical memory address, emulate a first message signaled interrupt identifying the host physical memory address.

In at least one embodiment, a disclosed method of processing interrupts in a multiprocessor system includes assigning an I/O device to a virtual machine, and associating a guest physical memory address with the I/O device in a multiprocessor system, the guest physical address space in an address space of the virtual machine. In at least one embodiment, a first cache line of a first cache of a first processor is mapped to the host physical memory address to associate the first processor with the MSIs of the I/O device as is a second cache line of a second cache of a second processor. In at least one embodiment, a coherency state of the first cache line and the second cache line is initialized to a shared state (S). In at least one embodiment, after the first processor receives, snoops, or otherwise detects an I/O device transaction referencing the host physical memory address, the first processor emulates an MSI indicating the host physical memory address and transitions the coherency state of the first cache line to a special purpose coherency state, referred to herein as the in-use state (I), indicating that the cache line is reserved from MSI handling and that an ISR associated with this cache line is currently executing. In at least one embodiment, after the second processor snoops the I/O device transaction referencing the first cache line, it transitions the coherency state of the second cache line to an in-use state (I) and requests a fill of the second cache line with data from either the host physical memory address or from the first processor's cache. In at least one embodiment, the I/O device transaction includes write data that is stored in the reserved cache line or the host physical system memory address; and the write data includes one or more interrupt vectors identifying a corresponding set of one or more ISR(s). In one embodiment, the I/O device write transaction may also include additional information, referred to as emulated MSI interrupt data or, more simply, emulated interrupt data that the ISR may use. The inclusion of interrupt data in the I/O device write transaction that initiates the MSI may, in at least one embodiment, beneficially eliminate or reduce the number of subsequent exchanges of data between the I/O device, the chipset and the processor. Interrupt data that the ISR(s) may need to perform interrupt handling may be referred to herein as emulated interrupt data.

In at least one embodiment, each processor that is to process interrupts from an I/O device may associate a cache line in an interrupt reserved portion of its last level cache with the I/O device. For example, a first cache line C1 in an interrupt reserved portion of a first processor's last level cache may be reserved for processing interrupts from an I/O device. A second cache line C2 in an interrupt reserved portion of a last level cache of a second processor, however, may also be reserved for interrupts from the I/O device. Identifying a cache line as an interrupt reserved cache line may include setting an interrupt reserved bit in the status field of the applicable cache line. Associating an interrupt reserved cache line with an I/O device may be achieved by setting an interrupt reserved bit of the selected cache line and associating or mapping the interrupt reserved cache line to a host physical memory address, i.e., the system memory address translated from a guest physical address in the address space of a virtual machine to which an I/O device has been assigned, where the guest physical address has been assigned to MSIs from the I/O device. This memory address may be referred to herein as the selected memory address.

As suggested by the preceding description, some embodiments leverage all or some of a system's existing cache coherency infrastructure to facilitate low latency MSI processing in a multi-processor, virtualization environment. For example, if cache line coherency state information indicates that the cache line is in a shared state (S), and snooping logic detects a write transaction to a memory address or to a direct cache address or, more simply, direct address of a second cache line that is being shared with the first line, the snooping logic in a conventional coherency mechanism will transition the coherency state of the cache line to invalid (I). In the context of a processor system that supports low latency MSI handling as described herein, the same transition of coherency state may occur, but if the line is identified as an interrupt reserved cache line, the I state may be recognized as a special-purpose coherency state, referred to herein as the in-use state (I) indicating that the cache line is reserved for MSI handling, is currently executing an ISR, and that the line is not eligible for eviction or replacement.

Also, an interrupt reserved cache line is not eligible for eviction even in the (S) state; this prevents the following scenario from occurring: during a cache line miss and memory fetch operation, cache line replacement logic automatically replaces the reserved cache line content with non-interrupt related data and triggers a spurious interrupt to processor. Interrupt reserved cache line can only be directly updated by its respective mapped I/O device through a DCA write to trigger an interrupt; or indirectly through a snoop hit whereby a mapped I/O device writes to a second interrupt reserved cache line that is shared with the first interrupt reserved cache line.

In addition, the transition from shared state (S) to in-use state (I) may initiate interrupt handling rather than indicating that the data in the interrupt reserved line is stale. Initiation of interrupt handling may include transitioning the coherency state of the cache line to an in-use state (I), proactively filling the cache line with posted write data that includes an ISR vector and emulated interrupt data from the snooped memory address, and emulating an MSI to the first processor when the cache line is filled with the posted write data. Because the data in the interrupt reserved line is not invalid, the (I) state to which the cache line transitions is referred to herein as the in-use state (I) to emphasize the distinction. In this example, the cache transitions the coherency state of the cache lines from a shared state (S) to an in-use state (I) automatically, but recognizes that an I state for an interrupt reserved line is a distinct state that, in this particular example, triggers emulation of an MSI.

In at least one embodiment, the transition from the shared state (S) to the in-use state (I) is employed even if a cache line is the only reserved cache line that is mapped to applicable memory address, to enforce a mechanism by which the I/O device's posted write data is written out to the selected memory address even if the I/O device posts the data to the cache directly via direct cache access.

In another embodiment, a disclosed multiprocessor system includes a first processor, an I/O device, and circuit to translate a guest physical memory address to a host physical memory address, the guest physical memory address in an address space of a virtual machine. The I/O device may be assigned to the virtual machines and the guest physical memory address may be associated with the I/O device's MSIs. A first cache memory of the system may include an interrupt reserved line mapped to the host physical memory address, cache decode logic to detect a memory access associated with a write transaction from the I/O device, and a cache controller. The cache controller may declare a cache line of the first cache as an interrupt reserved line, set a coherency state of the interrupt reserved line to shared, and in response to detecting an I/O device transaction containing a reference to the host physical memory address, emulate an MSI identifying the host physical memory address and transition a coherency state of the first cache line from the shared state (S) to the in-use state (I).

Detecting the I/O device transaction may include any of three or more scenarios including a first scenario in which the first processor receives a direct cache access (DCA) transaction from the I/O device, in which case the reference to the host physical memory address includes an address, contained in the I/O device DCA transaction, of a cache line in the first cache memory that maps to the host physical memory address, i.e., the first cache line. Direct cache access, as implied by its name, refers to the explicit addressing of a line in a cache array. In a second scenario, the first processor snoops an I/O device DCA transaction addressed to a second processor, in which case, the reference to the host physical memory address is the address, contained in the I/O device DCA transaction, of a second processor cache line that maps to the host physical memory address. In a third scenario, detecting the I/O device transaction may include the first processor snooping a direct memory access (DMA) from the I/O device referencing the host physical memory address.

In at least one embodiment, the system includes a second processor, a second cache memory including a second interrupt reserved line mapped to the host physical memory address, a second coherency controller to set a coherency state of the second interrupt reserved line to shared, and second cache decode logic. Analogous to the first cache decode logic, the second decode logic may detect a memory address associated with a write transaction from the I/O device, respond to detecting a reference to the host physical memory address in the write transaction by emulating an MSI identifying the host physical memory address, and transition a coherency state of the second cache line from shared to the in-use state (I). Emulating an MSI referencing a host physical memory address from the I/O device may include invoking one or more ISRs identified in one or more interrupt vectors stored at the host physical memory address and sequentially subsequent addresses.

The I/O device transaction may be a posted write transaction that includes posted write data. The posted write data may include, in addition to a conventional ISR vector, emulated interrupt data that indicates one or more thread-specific ISRs and/or thread-specific ISR data. The size of the posted write data may be compliant with a size of cache lines in the cache memories so that, for example, the I/O device transaction may write a cache line quantity of data to the host physical memory address, such that, when a coherency mechanism synchronizes an interrupt reserved cache line mapped to the host physical system memory address, the emulated interrupt data in memory is fetched and provided to the interrupt reserved cache line. Conversely, if the I/O transaction is a DCA transaction, data in the cache line is flushed out to the host physical system memory address.

In multiprocessor environments, different processors may include an interrupt reserved cache line associated with the same I/O device and, through the use of processor-specific data in emulated interrupt data, the first processor and the second processor may perform different functions during the ISR. For example, a first processor may perform a first function based on a first interrupt vector and/or a first subset of the emulated interrupt data while a second processor may perform a second function based on a second interrupt vector indicated in and/or a second subset of the same emulated interrupt data.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

An MSI transaction originates with an I/O device posting a write transaction addressed to a system memory address that has been configured, usually by the operating system during system configuration, as the system memory address associated with MSIs from the I/O device. In a traditional MSI transaction, the data written to the predetermined system memory address identifies an applicable interrupt service routine. When a chipset asserts an interrupt corresponding to the I/O device, the data value stored in the predetermined system memory address is used by an interrupt handler to identify a corresponding interrupt service routine. The data written to the predetermined system memory does not, however, communicate additional information to an interrupt handler.

Traditional MSI-based interrupt handling may exhibit unwanted latency. For example, after an I/O device generates an MSI transaction indicating a system-specified address, an interrupt handler associated with the MSI transaction must then communicate with the requesting device to retrieve any data other than the location of the interrupt service routine (ISR) required to service the interrupt. Because the I/O device may be hierarchically distant from the processor, latency associated with communications between a processor and the I/O device may be relatively long.

Referring now to the drawings, FIG. 1 depicts a block diagram of selected elements of a multiprocessor system 100 that includes a first processor 101-1, a second processor 101-2, and an I/O hub referred to herein as near hub 130. Near hub 130 communicates with processor 101-1 over a point-to-point interconnect 120-1 connected between a point-to-point interface 132-1 of near hub 130 and a point-to-point interface 112-1 of processor 101-1. Similarly, near hub 130 communicates with processor 101-2 via point-to-point interconnect 120-2 between point-to-point interface 132-2 of near hub 130 and point-to-point interface 112-2 of processor 101-2. In the FIG. 1 embodiment, near hub 130 also includes a graphics interface 136 to communicate with a graphics adapter 140 over a dedicated graphics bus 141, which may be a PCI Express or other suitable type of interconnection. Multiprocessor system 100 may further include a point-to-point interconnect (not depicted) between processor 101-1 and processor 101-2. The point-to-point interconnects 120 depicted in FIG. 1 include a pair of uni-directional interconnections with one of the interconnects communicating data from the applicable processor 101 to near hub 130 and the other interconnection communicating data from near hub 130 to the processor 101.

The FIG. 1 processors 101 may be described as including a core portion 103 and an uncore portion 105. The core portions 103 of the FIG. 1 processors 101 include multiple processor cores, referred to herein simply as cores 104-1 through 104-n. Each core 104 may include logic implemented in hardware, firmware, or a combination thereof that provides, as examples, an execution pipeline suitable for fetching, interpreting, and executing instructions and storing or otherwise processing results of those instructions. Uncore portions 105 of the FIG. 1 processors 101 may include a system memory controller (MC) 106, a cache memory referred to herein as the last level cache 110, and an interrupt controller 113. Each system memory interface 106 may perform various memory controller functions. Last level cache 110 may be shared among each of the cores 104 of processor 101. Interrupt controller 113 may include features of conventional interrupt controllers to manage and prioritize interrupts in a complex system, but interrupt controller 113 may also be invoked when a processor emulates an MSI as described below.

The FIG. 1 multiprocessor system 100 employs a distributed or non-uniform system memory architecture in which the system memory as a whole is implemented as a plurality of system memory portions 150 with each system memory portion 150 being directly connected to a processor 101 via a corresponding memory interconnect 111 and system memory interface 106. In this distributed memory configuration, each processor 101 may interface directly with its corresponding system memory portion 150 via its local system memory interface 106. In addition, any processor, e.g., processor 101-1, may read from or write to a memory portion, e.g., system memory portion 150-2 associated with a different processor, e.g., processor 101-2, but the originating processing may need to go through one or more point-to-point interfaces 120 to do so. Similarly, the last level cache 110 of each processor 101 may cache data from its own processor's system memory portion 150 or from another processor's system memory portion.

Although FIG. 1 depicts a distributed memory configuration, other embodiments may employ a uniform memory architecture in which, for example, the entire system memory is connected to a memory controller implemented in near hub 130 rather than having multiple system memory portion 150, each connected to a corresponding processor-specific memory controller 106 implemented in the uncores 105 of each processor 101. Such a system is described below with respect to FIG. 6. Moreover, although FIG. 1 depicts a point-to-point configuration in which processors 101 communicate with each other and with near hub 130 via dedicated point to point interconnections 120, other embodiments may employ a shared system bus to which each of the processors 101 and near hub 130 is connected.

In the FIG. 1 embodiment of system 100, near hub 130 includes a memory address remapping circuit 135 to provide for mapping an I/O device into a domain (as described below) in system memory 150 in an I/O transaction, such as a DMA or DCA request. Remapping circuit 135 provides hardware support to facilitate or enhance I/O device assignment and/or management. Although shown in near hub 130, it may be included, partly or wholly, elsewhere in system 100.

In the FIG. 1 embodiment of system 100, near hub 130 also includes an I/O interface 134 to communicate with a far hub 160 over an I/O interconnection 135. Far hub 160 may integrate, within a single device, adapters, controllers, and ports for various interconnection protocols to support different types of I/O devices. The depicted implementation of far hub 160 includes, as an example, an expansion bus controller 161 that supports an expansion bus 165 that complies with PCI, PCI Express, or another suitable bus protocol. Examples of functions that may be provided via expansion bus 165 include a network adapter 162, an audio controller 167, and a communications adapter 169. Network adapter 162 may enable communication with an IEEE 802.11 family or other type of wireless data network, a Gigabit Ethernet or other type of wire line data network, or both. Audio controller 167 may include or support high definition audio codecs. Communications adapter 169 may include or support modems and/or transceivers to provide wireless or wire line telephony capability. I/O device 163 may represent any I/O device referred to herein or any other I/O device.

Bus controller 161 may further recognize a bus bridge 164 that supports an additional expansion bus 166 where expansion bus 166 and expansion bus 165 have the same protocol or different protocols. Far hub 160 may further include a high bandwidth serial bus controller 170 that provides one or more ports 172 of a Universal Serial Bus (USB) or other suitable high bandwidth serial bus 175.

The FIG. 1 far hub 160 further includes a storage adapter 180 that supports a persistent storage interconnect 185 such as an Integrated Drive Electronics (IDE) interconnect, a Serial ATA interconnect, a SCSI interconnect, or another suitable storage interconnect to a storage drive 181 that controls persistent storage 182. Far hub 160 may further include a Low Pin Count (LPC) controller 190 that provides an LPC bus 195 to connect low bandwidth I/O devices including, as examples, a keyboard 193, a mouse 194, a parallel printer port (not depicted), and an RS232 serial port (not depicted). Multiprocessor system 100 as depicted in FIG. 1 employs a Super I/O chip 192 to interface keyboard 193 and mouse 194 with LPC controller 190.

In at least one embodiment, the emulated MSI functionality described herein is suitable employed in a system that includes some or all of various system features. The FIG. 1 embodiment of system 100 emphasizes a computer system that incorporates various features that facilitate handheld or tablet type of operation and other features that facilitate laptop or desktop operation. In addition, the FIG. 1 embodiment of system 100 includes features that cooperate to aggressively conserve power while simultaneously reducing latency associated with traditional power conservation states.

The FIG. 1 embodiment of system 100 includes an operating system 183 that may be entirely or partially stored in a persistent storage 182. Operating system 183 may include various modules, application programming interfaces, and the like that expose to varying degrees various hardware and software features of system 100. The FIG. 1 embodiment of system 100 includes, for example, a sensor application programming interface (API) 184, a resume module 186, a connect module 187, and a touchscreen user interface 188. System 100 as depicted in FIG. 1 may further include various hardware/firmware features including a capacitive or resistive touch screen controller 174 and a second source of persistent storage such as a solid state drive 189.

Sensor API 184 provides application program access to one or more sensors (not depicted) that may be included in system 100. Examples of sensors that system 100 might have include, as examples, an accelerometer, a global positioning system (GPS) device, a gyrometer, an inclinometer, and a light sensor. The resume module 186 may be implemented as software that, when executed, performs operations for reducing latency when transition system 100 from a power conservation state to an operating state. Resume module 186 may work in conjunction with the solid state drive (SSD) 189 to reduce the amount of SSD storage required when system 100 enters a power conservation mode. Resume module 186 may, for example, flush standby and temporary memory pages before transitioning to a sleep mode. By reducing the amount of system memory space that system 100 is required to preserve upon entering a low power state, resume module 186 beneficially reduces the amount of time required to perform the transition from the low power state to an operating state. The connect module 187 may include software instructions that, when executed, perform complementary functions for conserving power while reducing the amount of latency or delay associated with traditional "wake up" sequences. For example, connect module 187 may periodically update certain "dynamic" applications including, as examples, email and social network applications, so that, when system 100 wakes from a low power mode, the applications that are often most likely to require refreshing are up to date. The touchscreen user interface 188 supports a touchscreen controller 174 that enables user input via touchscreens traditionally reserved for handheld applications. In the FIG. 1 embodiment, the inclusion of touchscreen support in conjunction with support for keyboard 193 and mouse 194 enable system 100 to provide features traditionally found in dedicated smart phone and tablet devices as well as features found in dedicated laptop and desktop type systems.

Returning to far hub 160, memory address remapping circuit 135 provides for mapping an I/O device into a domain in system memory 150 in an I/O transaction. A domain is abstractly defined as an isolated environment in the platform, to which a subset of the host physical memory is allocated. The host physical memory is included in the system memory 150. I/O devices that are allowed to directly access the physical memory that is allocated to a domain are referred to as the domain's assigned devices. The isolation property of a domain is achieved by blocking access to its physical memory from resources not assigned to it. Multiple isolated domains are supported by ensuring all I/O devices are assigned to some domain (possibly a default domain), and by restricting access from each assigned device only to the physical memory allocated to its domain.

Each domain has a view of physical memory, or a physical address space, that may be different than the system view of physical memory. Addresses used by a domain's resources to access its physical address space are referred to as guest physical addresses (GPAs). The host physical address (HPA) refers to the system physical address used to access memory. A domain is considered relocated if its GPA is translated to a new HPA to access its allocated system physical memory. A domain is referred to as non-relocated if its guest physical address space is the same as, or a subset of, the system's host physical address space. The logical separation of GPA and HPA provides the basis for enforcing memory protection. It uses a physical-address translation and protection mechanism that validates guest physical addresses generated by a domain's assigned devices and translates them to valid host physical addresses. Remapping circuit 135 provides hardware support for this validation and translation.

Figure 8:
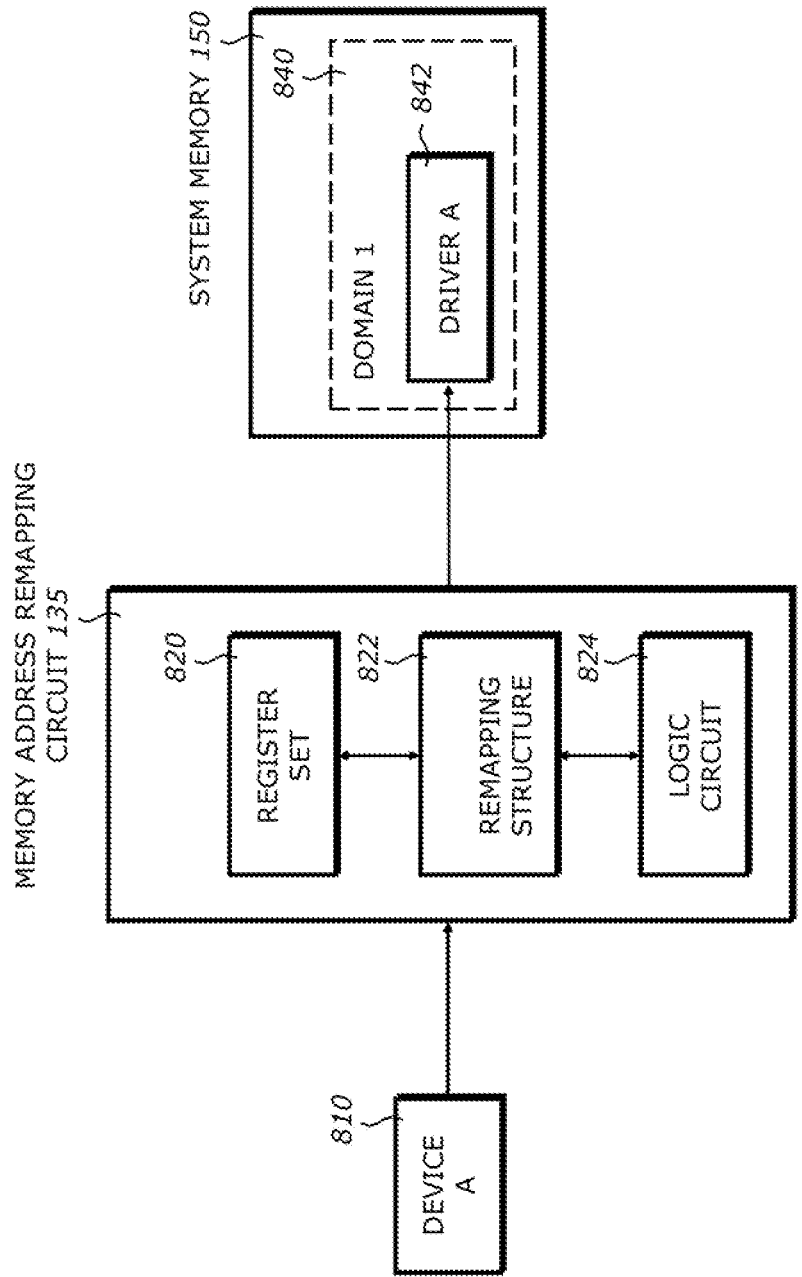
FIG. 8 illustrates an I/O device assignment according to one embodiment.

FIG. 8 is a diagram illustrating an input/output (I/O) device assignment according to one embodiment of the invention. The I/O device assignment is a mapping of an I/O device to a domain in the system memory 150. The mapping is supported by memory address remapping circuit 135. As an example, device A 810 is mapped into domain 1 840 in the system memory 150. The domain 1 may have a driver 842 for the device A 810. More than one driver may also be used.

Remapping circuit 135 includes a register set 820, a remapping structure 822, and a logic circuit 824. The register set 820 includes a number of registers that provide control or status information used by the remapping structure 822, the logic circuit 824, and the programs or drivers for the I/O devices. The remapping structure 822 provides the basic structure, storage, or tables used in the remapping or address translation of the guest physical address to the host physical address in an appropriate domain. The logic circuit 824 includes circuitry that performs the remapping or address translation operations and other interfacing functions. The remapping circuit 135 may have different implementations to support different configurations and to provide different capabilities for the remapping or address translation operations.

The I/O device assignment and/or management using the remapping circuit 135 provide a number of usages, including usages in virtualization environments. With direct assignment of I/O devices to domains corresponding to VMs, the driver for an assigned I/O device runs only in the VM to which it is assigned and is allowed to interact directly with the device hardware without trapping to the VMM.

Figure 9:
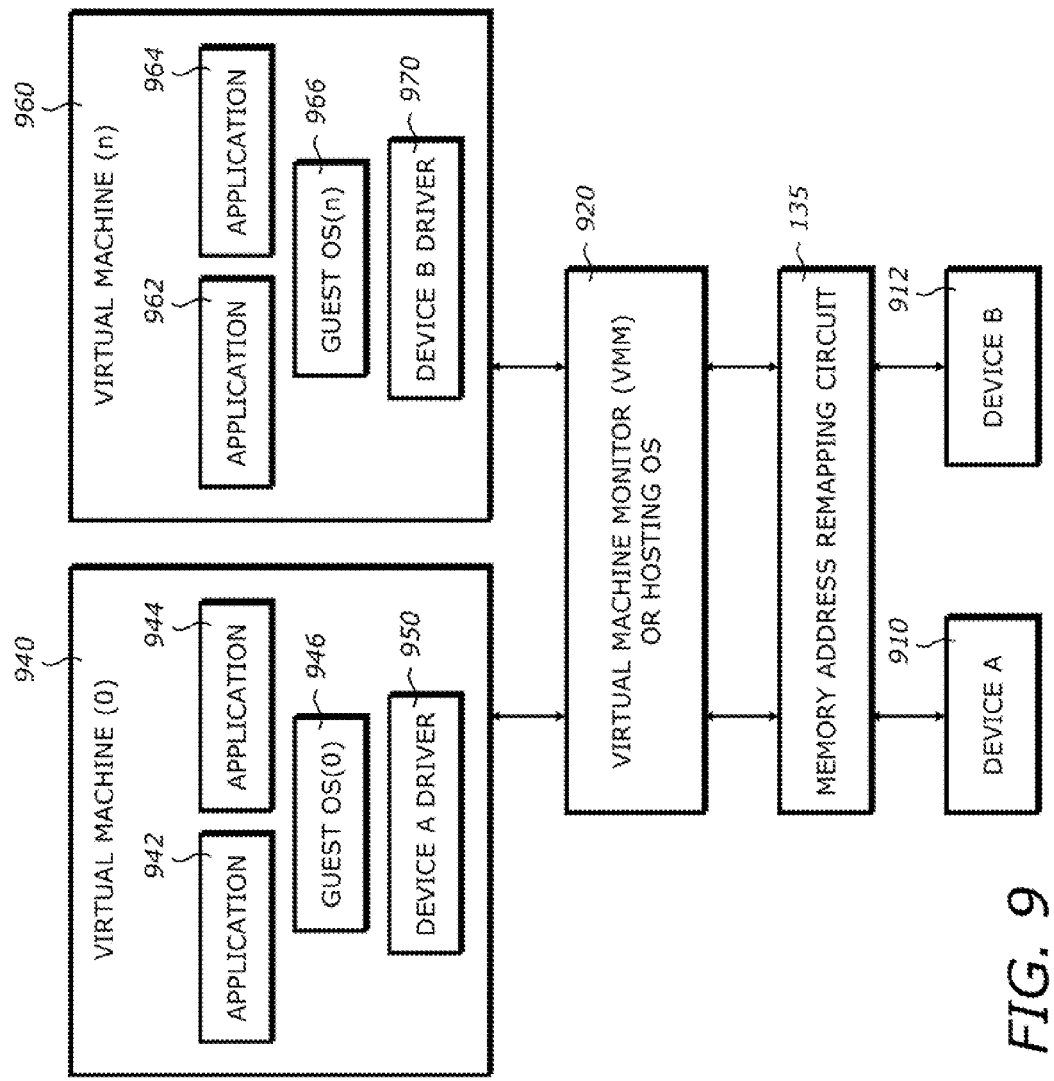
FIG. 9 illustrates virtualization using memory address remapping according to one embodiment.

FIG. 9 is a diagram illustrating virtualization using memory address remapping according to one embodiment of the invention. The virtualization includes two devices A 910 and B 912, the remapping circuit 135, a VMM or hosting operating system (OS) 920, $VM_0$ 940 and $VM_n$ 960. The two devices A 910 and B 912 are two I/O devices that are assigned to the two VMs 940 and 960, respectively. The remapping circuit 135 directly maps these two devices to the respective VMs 940 and 960.

The VM 940 includes applications 942 and 944. More or less applications may be supported. It has a guest OS 946 and a device A driver 950. The device A driver 950 is a driver that drives, controls, interfaces, or supports the device A 910. Similarly, the VM 960 includes applications 962 and 964. More or less applications may be supported. It has a guest OS 966 and a device B driver 970. The guest OS 966 may be the same or different than the guest OS 946 in the VM 940. The device B driver 970 is a driver that drives, controls, interfaces, or supports the device B 912. With the remapping circuit 135, the device A and B drivers 950 and 970 may interact directly with the respective I/O devices 910 and 912 without causing a VM exit to the VMM.

The remapping architecture provided by the remapping circuit 135 facilitates the assigning of I/O devices to any number of domains or VMs, each with a different guest physical address space that may be different from the system physical address space. The remapping provides the transformation of the guest physical address (GPA) from an I/O device to the corresponding host physical address (HPA) allocated to its domain. The remapping circuit 135 treats the address in a DMA or DCA request as a guest physical address (GPA), and may apply the address translation function to the incoming address to convert it to a host physical address (HPA) before further hardware processing, such as snooping of processor caches or forwarding to the memory controller. In a virtualization usage, the address translation function implemented by the remapping circuit 135 depends on the physical-memory management supported by the VMM. For example, in usages where the VMM allocates host physical memory allocations as contiguous regions, the translation of GPAs to HPAs may be a simple offset addition. In usages where the VMM manages physical memory at page granularity, the remapping circuit 135 may use a memory-resident address translation data structure.

Figure 10:
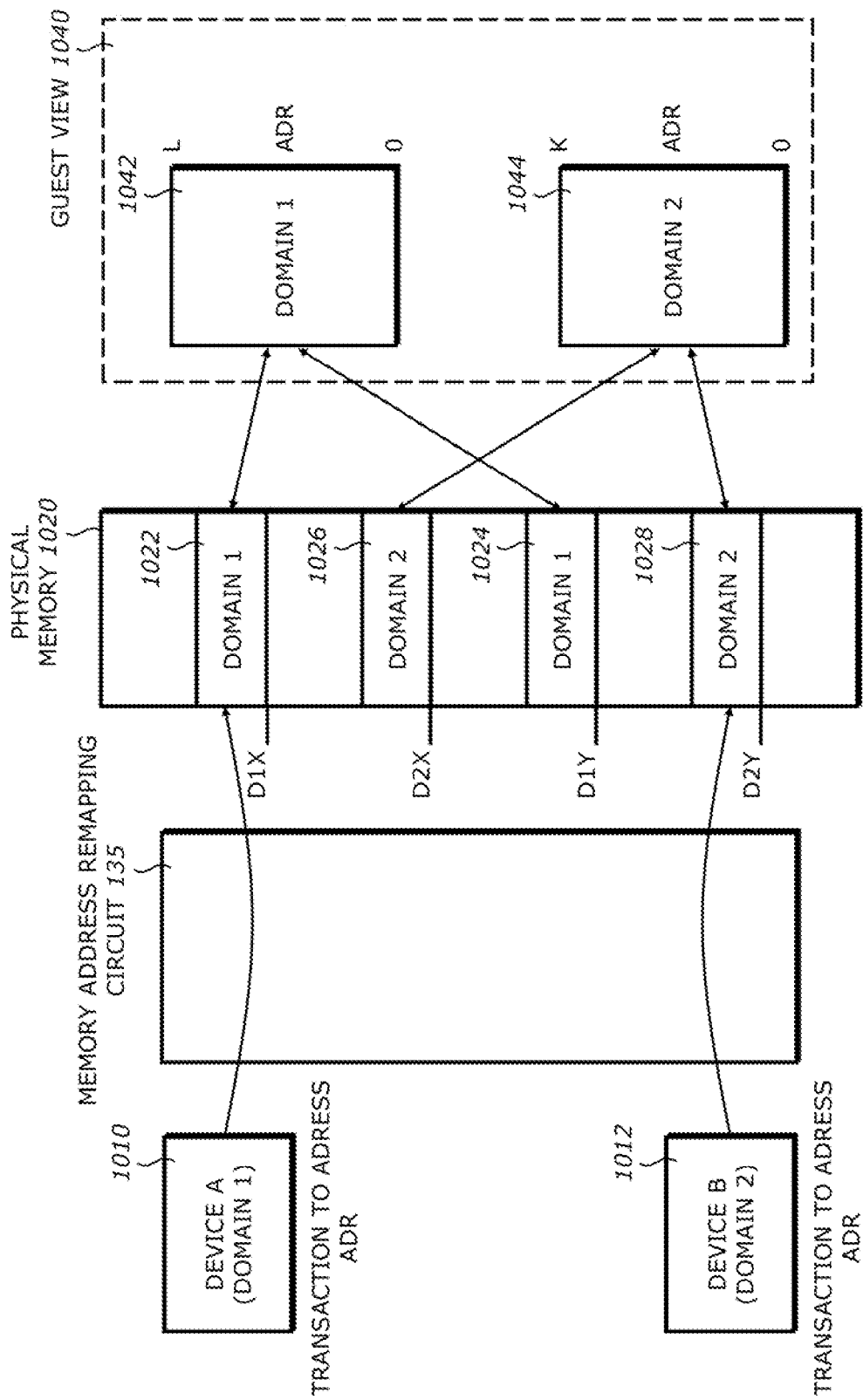
FIG. 10 illustrates an address translation according to one embodiment.

FIG. 10 is a diagram illustrating an address translation according to one embodiment of the invention. The address translation involves two I/O devices A 1010 and B 1012, the remapping circuit 135, a physical memory 1020, and a guest view 1040. The I/O device A 1010 is assigned to domain 1 and the I/O device B 1012 is assigned to domain 2. They both perform DMA or DCA requests to address ADR. The remapping circuit 135 maps the addresses used by these two devices to the corresponding domains allocated in the physical memory 1020. The physical memory 1020 includes sections 1022 and 1024 allocated to domain 1 and sections 1026 and 1028 allocated to domain 2. More or less memory sections may be allocated for each domain. In the example illustrated in FIG. 10, address ADR from device A 1010 is mapped to section 1022 allocated to domain 1, and address ADR from device B 1012 is mapped to section 1028 allocated to domain 2.

The guest view 1040 is a logical view from the I/O devices. It includes domains 1 1042 and 2 1044. The domain 1 1042 corresponds to the two sections 1022 and 1024 in the physical memory 1020. The domain 2 1044 corresponds to the two sections 1026 and 1028. The ADR address from the device A 1010 is mapped to the ADR address located within the address space from 0 to L of the domain 1 1042. Similarly, the ADR address from the device 2 1012 is mapped to the ADR address located within the address space from 0 to K of the domain 2 1044. The VMM or other software responsible for the creation and management of the domains allocates the physical memory 1020 for both domains and sets up the GPA-to-HPA address translation function in the remapping circuit 135. The remapping circuit 135 translates the GPAs generated by the devices 1010 and 1012 to the appropriate HPAs.

Figure 2:
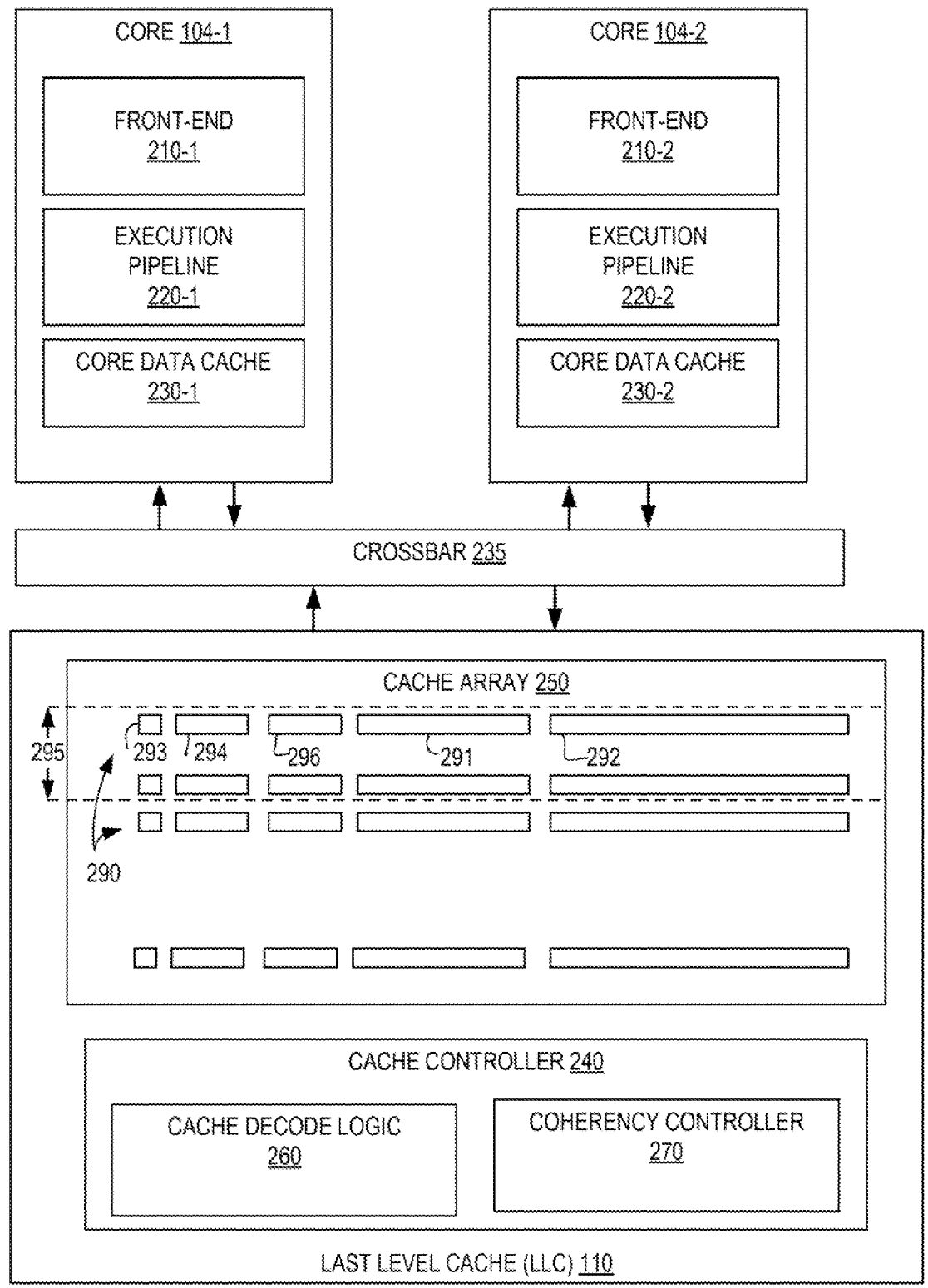
FIG. 2 illustrates a processor used in conjunction with at least one embodiment.

Turning now to FIG. 2, a depicted embodiment of a processor 101 suitable for implementing coherency-leveraged MSI processing in a multiprocessor platform includes a first core 104-1 and a second core 104-2. In the FIG. 2 embodiment, each core 104 includes a front end 210, an execution pipeline 220, and a core data cache 230. Front end 210 may include an instruction cache, an instruction fetch unit, and a branch prediction unit. Execution pipeline 220 may include logic and/or microcode resources to decode instructions, load registers with instruction operands, execute operations indicated by the instructions, and write back or otherwise retire results of executed instructions. Core data cache 230 may include, in addition to a cache array, a translation lookaside buffer (not depicted), and a crossbar or interface 235.

The FIG. 2 embodiment of uncore portion 105 of processor 101 depicts a last level cache 110 including a cache controller 240 and a data cache array 250. The depicted embodiment of cache controller 240 includes a cache decode logic 260 and coherency controller 270. In at least one embodiment, cache decode logic 260 monitors memory access transactions and indicates transactions that satisfy specified criteria. In the context of MSI transactions, for example, cache decode logic 260 may snoop addresses indicated in the DMA and DCA transactions from I/O device 163 and detects when MSI transactions include references to addresses associated with I/O device 163. If, for example, first processor 101-1 is configured to process interrupts from I/O device 163 and system memory address M1 has been assigned to I/O device 163 as the address for MSI requests generated by I/O device 163, cache decode logic 260 monitors address references in MSI transactions, as well as other transactions, for references to M1. When cache decode logic 260 detects an MSI transaction having a reference to M1 or a reference to a cache line mapped to M1, cache decode logic 260 may signal coherency controller 270.

Coherency controller 270 maintains the coherency state of cache array 250. In at least one embodiment, coherency controller 270 maintains coherency according to an MESI protocol for cache lines 290 not reserved for MSI handlings.

The FIG. 2 cache array 250 includes a number of cache lines 290, each of which includes a tag 291 and corresponding data 292. The number of lines 290 in cache array 250 may be referred to as the number of sets. Although not depicted in FIG. 2, each set may include multiple cache lines 290, which may be referred to as "ways," to provide features of fully associative cache configurations as well as set associate cache configurations. Regardless of the specific configuration, however, cache array 250 reflects a mapping between each of its cache lines 290 and a corresponding system memory address.

As depicted in FIG. 2, each cache line 290 includes, in addition to the corresponding cache line data 292, a tag 291 that indicates a portion of the system memory address to which the cache line is mapped, certain status information 296, coherency state information 294, and an interrupt reserved indicator 293 of one or more bits for purposes of implementing coherency-leveraged MSI processing as described herein. In at least one embodiment, a predefined subset of cache lines 290 may be configurable as interrupt reserved lines. In the FIG. 2 embodiment, for example, a portion 295 of cache lines 290 are eligible as interrupt reserved cache lines.

Figure 3:
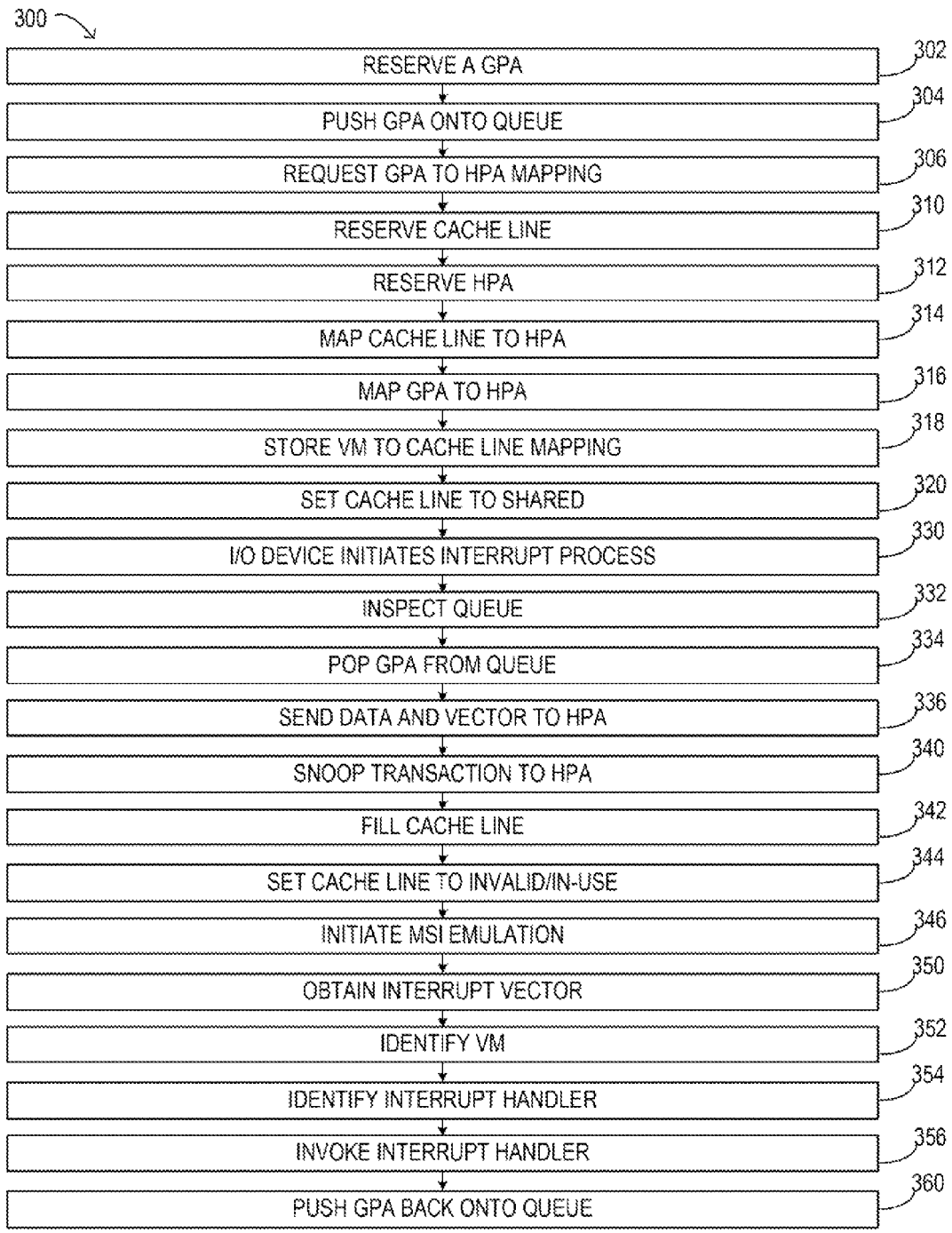
FIG. 3 illustrates an MSI processing method according to one embodiment.

FIG. 3 illustrates selected operations of an embodiment of a method 300 for emulating MSIs in a virtualization environment. In operation 302, a memory address G1 in the physical address space of an OS is reserved, for example, by the OS. The OS is a guest OS running on a VM in system 100, so the memory address G1 is a GPA. The memory address G1 is reserved for a device driver of an I/O device (e.g., I/O device 163) that is assigned or may be assigned to the VM.

In operation 304, memory address G1 is written, for example, by the OS, to an interrupt DMA address queue for the I/O device. In operation 306, an interrupt mapping service request is made, for example, by the OS to the VMM, for the memory address G1 to be mapped to a system physical memory address to be used by the I/O device for an interrupt.

In operation 310, a cache line (e.g., cache line 290) is reserved, for example, by the VMM, by setting an interrupt reserved indicator (e.g. interrupt reserved indicator 293) for the cache line. Setting the interrupt reserved indicator indicates that the corresponding line is reserved for implementing low latency MSI processing, with data, as described herein and that the corresponding line is unavailable as a conventional cache line. An interrupt reserved line is ineligible for cache line replacement during a cache miss and, therefore, should not be evicted from the cache under a least recently used (LRU) or other replacement policy. However, snooping is still enabled for the cache line.

In operation 312, a system memory address M1 is reserved, for example, by the VMM, for use by the I/O device for the interrupt, where M1 is in the portion of the system memory allocated to the VM. In operation 314, the interrupt reserved cache line is mapped, for example, by the VMM, to the system memory address M1. In operation 316, the guest memory address G1 is mapped, for example, by the VMM, to the system memory address M1. For example, remapping circuit 135 may be configured with guest memory address G1 as a GPA to be translated to system memory address M1 as an HPA. In operation 318, an entry is stored, for example, by the VMM, in a VM to interrupt cache line mapping table to indicate the association of the VM and the interrupt reserved cache line. In one embodiment, the VM may be identified using an identifier of a virtual interrupt controller associated with the VM.

In operation 320, the coherency state of the interrupt reserved cache line is set to a shared state (S). Embodiments of the present invention leverage at least some features of the cache coherency protocol implemented in cache coherency controller 270 to facilitate low latency MSI processing across multiple processors. As indicated above, cache coherency controller 270 may, in at least one embodiment, support standard MESI coherency states for cache lines not reserved for MSI processing. Standard MESI coherency states include modified, exclusive, shared, and invalid cache coherency states. Cache coherency controller 270 may also support coherency states in addition to standard MESI states including, as an example, a forward state (F) that indicates the last core to access a cache line that is shared between two or more cores.

Cache coherency controller 270 may also treat interrupt-reserved cache lines differently than other cache lines by, as examples, supporting certain coherency states, including the in-use state (I), for interrupt reserved cache lines and treating certain states, including the shared state (S), differently depending upon whether the cache line is interrupt-reserved or not. For purposes of this disclosure, the shared state (S), when used for conventional caching of system memory data, indicates that the line of data may be stored in another cache, but is coherent with system memory. Under a standard MESI protocol, a cache line in the S state can be transitioned to the invalid (I) state at any time.

The FIG. 3 embodiment of method 300 continues in operation 330 when the I/O device wants to send an interrupt to the guest OS device driver. In operation 332, the interrupt DMA address queue for the I/O device is inspected. In this example, memory address G1 has been written to the interrupt DMA address queue. However, if the interrupt DMA address queue is empty, one or more existing interrupts is being serviced, and the guest OS is not interrupted until it is done servicing the existing interrupts. In operation 334, memory address G is popped from the interrupt DMA address queue. In operation 336, the interrupt data and one or more interrupt vectors are sent to the memory address G1, for example, using a DMA transaction in which guest memory address G1 is translated to system memory address M1 by remapping circuit 135.

In operation 340, a snoop detects a memory transaction referencing an address to which an interrupt reserved cache line is mapped, in this example, the DMA transaction to system memory address M1. The snooping processor responds in operation 342 by retrieving the data from M1 or directly from another cache, in operation 344 by changing coherency state of the interrupt reserved cache line from the shared state (S) to the invalid/in-use state (I), and in operation 346 by initiating an emulated MSI.

When used in conjunction with MSIs, the transition from shared state (S) in response to a snoop should not be interpreted as indicating the line's data as being invalid, but instead indicates that the applicable core is executing an ISR. Like the conventional MESI shared state (S), however, the shared state (S) in an MSI implementation indicates multiple processors monitoring the same I/O device using a memory coherency cache snooping mechanism. In addition, MSIs can be effectively propagated to multiple processors by snooping the MSI transactions of other processors or devices and initiating a shared-to-invalid coherency transition when another processor initiates an MSI with respect to a particular I/O device. It should be noted, however, that if the I/O device initiated the MSI using a DCA to a cache line that is mapped to system memory address M1, M1 cannot be assumed to have valid data until the contents of the cache line addressed by the DCA are flushed to system memory.

Returning to the FIG. 3 embodiment of method 300, in operation 350 the snooping processor's interrupt controller extracts the one or more interrupt vectors from the interrupt data in the interrupt reserved cache line. In operation 352, the interrupt controller inspects the VM to interrupt cache line mapping table determine which VM is associated with the interrupt reserved cache line. In operation 354, the interrupt controller uses the one or more interrupt vectors and the identity of the VM to identify the guest OS device driver's interrupt handler. In operation 356, the interrupt handler is invoked to service the interrupt using data from the interrupt reserved cache line.

In operation 360, after the interrupt has been serviced, the guest OS device driver pushes memory address G1 back into the I/O device's interrupt DMA address queue to re-enable the interrupt. Note that future interrupts from the same I/O device using G1 are automatically disabled until operation 360 is performed, so the device driver does not need to pro-actively use I/O transactions to disable interrupts. If the processor is able to concurrently handle multiple interrupts from the I/O device, then multiple interrupt DMA addresses may be used for the I/O device and each pushed onto the I/O device's interrupt DMA address queue.

Figure 4:
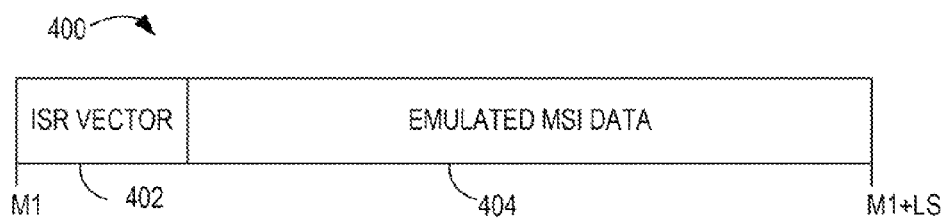
FIG. 4 illustrates an I/O device according to one embodiment.

Referring now to FIG. 4, selected elements of an embodiment of posted write data 400 are depicted. In the FIG. 4 embodiment of posted write data 400, posted write data 400 includes an ISR vector 402 and emulated interrupt data 404. The ISR vector 402 may be a standard MSI service routine vector. In conventional MSI, the I/O device is pre-assigned a system memory address (e.g., M1) and a specific data word to identify the interrupts to the system. When the I/O device wants to initiate an interrupt, it posts the data word assigned to it by the system to the system memory address assigned to it by the system and may append an interrupt number to the pre-assigned data word. The system memory address (e.g., M1) assigned to an I/O device may be the address of a register in an interrupt controller such as the programmable interrupt controllers 113 depicted in FIG. 1. To retain the functionality of conventional MSI processing, posted write data 400 as depicted in FIG. 4 includes an ISR vector 402 containing the same or substantially the same information that the I/O device would post in a conventional MSI implementation.

On the other hand, the depicted embodiment of posted write data 400 includes emulated interrupt data 404, which represents an extension of conventional MSI processing to facilitate low latency MSI handling and to support implementations in which multiple processors or cores respond to the same MSI from an I/O device, but perform different ISRs and/or perform an ISR using data that is specific to the processor. The processor-specific or ISR-specific information is appended to the conventional ISR vector 402 and, when used in conjunction with a processor's cache memory facilities, provides fast access to data that the ISR may require. In the implementation depicted in FIG. 4, posted write date 400 is stored at memory location M1 and occupies a portion of system memory extending from system memory address M1 to system memory address M1+LS where LS refers to the line size of the applicable cache memory. Thus, for example, if the applicable cache memory employs 64 byte cache lines, posted write data 400 may include 64 bytes of information.

Figure 5:
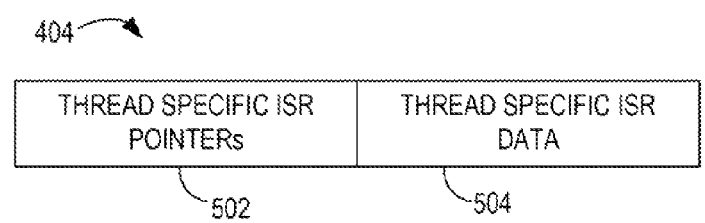
FIG. 5 illustrates emulated interrupt data according to one embodiment.

FIG. 5 depicts examples of two types of information that may be included within emulated interrupt data 404 of the posted write data 400 of FIG. 4. In the FIG. 5 depiction, emulated interrupt data 404 includes thread-specific ISR pointers 502 and thread-specific ISR data 504. The thread-specific ISR pointers 502 enable different threads to execute essentially distinct ISRs. This would enable different processors to perform, for example, different functions in response to a single interrupt from a single I/O device. The thread-specific pointer might be associated with the applicable threads using a mechanism to convey the identity of the processor. For example, the ISR associated with ISR vector 402 (FIG. 4) may include an initial sequence in which the identity of the executing processor is determined. After the processor ID is determined, this information might be used to selectively execute a thread-specific ISR as indicated in emulated interrupt data 404 through thread-specific ISR pointers 502.

Similarly, identification of the executing thread may be employed to access thread-specific ISR data 504. Thread-specific ISR data 504 might be employed to enable two different processors to perform the same function on different parameters. For example, in response to a single MSI, a first processor could retrieve a first block of information from a first portion of a storage device while a second processor retrieves a second block of information from a second portion of the storage device where the first portion of the storage device is indicated by a first part of thread-specific ISR data 504 and the second portion of the storage device is indicated by a second part of thread specific ISR data 504. Thread-specific ISR pointers 502 and thread-specific ISR data 504 may be combined so that, for example, a first processor or thread executes a first function through a first pointer indicated in 502 while a second thread executes a second function through a second pointer indicated in 502 while both functions employ thread specific data indicated in 504. Although FIG. 5 depicts emulated interrupt data 404 including both thread-specific ISR pointers 502 and thread-specific ISR data 504, other implementations may omit one or both of these fields and may include other types of information.

Figure 6:
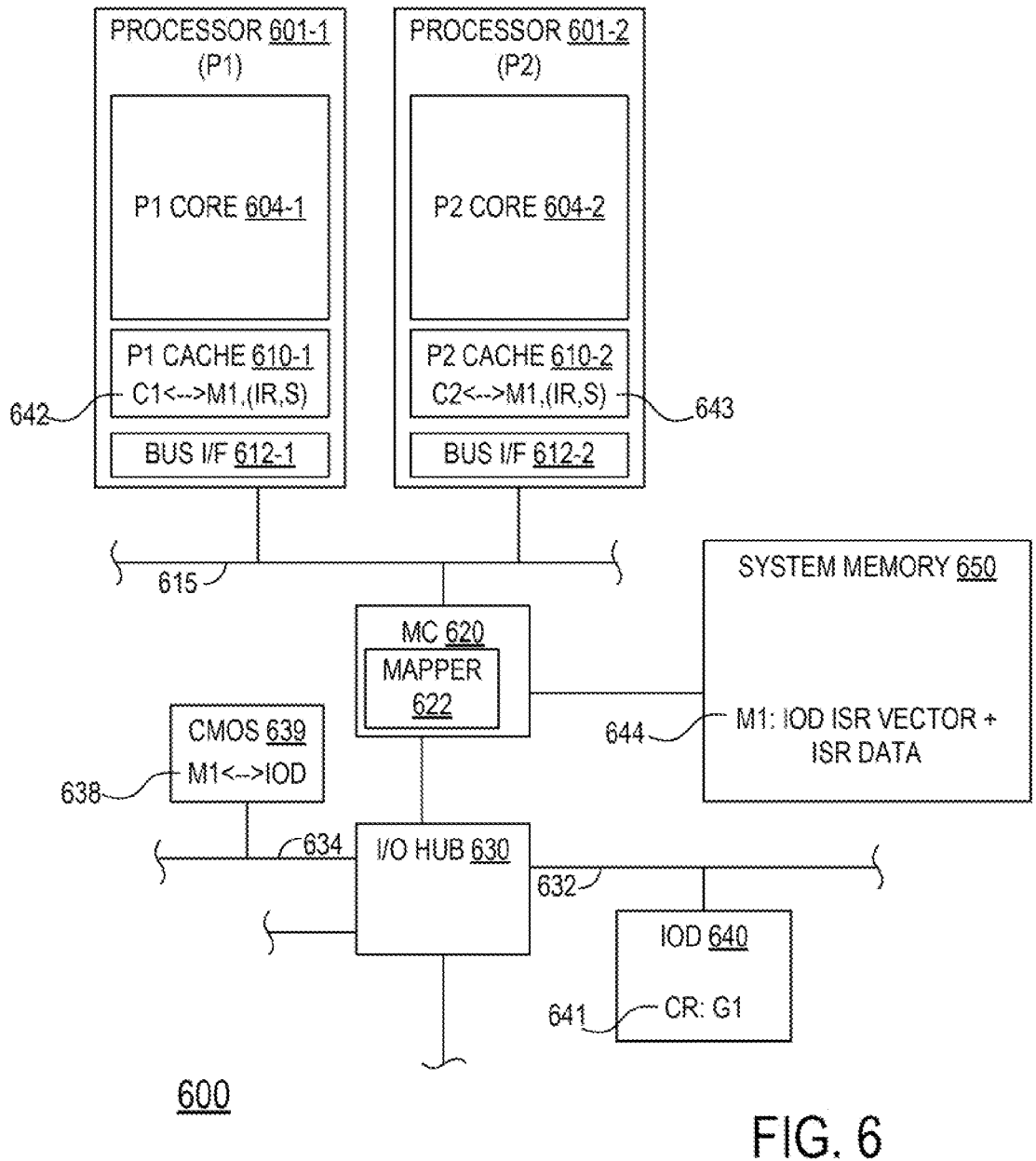
FIG. 6 illustrates a multiprocessor system used in conjunction with at least one embodiment.

Referring to FIG. 6, selected features of a second embodiment of a multiprocessor system is described. The FIG. 6 embodiment of multiprocessor system 600 includes a first processor (P1) 601-1, a second processor (P2) 601-2, and a memory controller 620 connected to a shared system bus 615. The FIG. 6 embodiment of processors 601 include an execution core 604, a corresponding cache 604 and a bus interface 612 to facilitate communication with shared bus 615. Memory controller 620 provides P1 601-1 and P2 601-2 with access to system memory 650. An I/O hub 630 interfaces with memory controller 620 and provides a bridge to an I/O bus 632. An I/O device 640 is connected to I/O bus 632.

In the FIG. 6 embodiment of system 600, memory controller 620 includes a memory address remapping circuit 622 to provide for mapping an I/O device into a domain in system memory 650 in an I/O transaction, such as a DMA or DCA request. Remapping circuit 622 provides hardware support to facilitate or enhance I/O device assignment and/or management. Although shown in memory controller 620, it may be included, partly or wholly, elsewhere in system 600. Address remapping circuit 622 may provide for mapping an I/O device into a domain in system memory 150 in an I/O transaction and translating GPAs to HPAs according to the description of address remapping circuit 135 shown in FIG. 1.

It will be appreciated that multiprocessor system 600 differs from multiprocessor system 100 depicted in FIG. 1 in several respects. The FIG. 6 multiprocessor system 600 employs a shared bus architecture in which P1 601-1 and P2 601-2 must arbitrate for access to shared system bus 615 and to system memory 650. In addition, whereas multiprocessor system 100 of FIG. 1 has a distributed system memory, multiprocessor system 600 has a uniform memory architecture in which system memory 650 is an architecturally contiguous memory and in which each processor 601 is architecturally equidistant from system memory 650. Moreover, whereas processors 101 in multiprocessor system 100 in FIG. 1 feature an uncore portion 105 including an integrated memory controller, the memory controller 620 of system 600 is depicted as a chip set device external to processor 601. Despite these architectural distinctions, the FIG. 6 system 600 and the FIG. 1 system 100 both implement coherency-based MSI for multiprocessor systems as described herein.

The FIG. 6 system 600 includes a persistent storage element in the form of battery-backed CMOS storage 639, accessible to processors 601 via a low bandwidth bus 634, e.g., an LPC bus, to provide system configuration information that system 600 may access, for example, during a boot sequence. CMOS 639 as shown in FIG. 6 includes data 638 indicating an association between I/O device (I/O device) 640 and system memory address M1. Data 638 conveys that M1 is the system memory address assigned for MSI transactions initiated by I/O device 640.

The FIG. 6 embodiment of multiprocessor system 600 has been configured to support coherency-leveraged MSI handling for multiprocessor systems in a virtualization environment. As depicted in FIG. 6, system 600 includes data 641 in I/O device 640, data 642 in P1 cache 610-1, data 643 in P2 cache 610-2, and data 644 in system memory 650. Data 641 represents data stored in a configuration register or other suitable storage element of I/O device 640. The configuration register is shown as storing a value G1 to indicate that G1 is a GPA which is mapped to HPA M1, the system memory address to which I/O device 640 posts write transactions for MSIs. Although FIG. 6 shows data 641 as a value in a configuration register, data 641 may be stored in memory or other types of storage of I/O device 640.

Data 642 in P1 cache 610-1 conveys that a selected cache line in P1 cache 610-1, namely, the cache line with address C1, has been mapped to system memory address M1. Data 642 also conveys that cache line C1 has been designated as an interrupt reserved cache line and that the cache line has a shared (S) coherency state. Similarly, data 643 in P2 cache 610-2 conveys that a selected cache line in P2 cache 610-2, namely, the cache line with address C2, has also been mapped to system memory address M1. Data 643 also conveys that cache line C2 has been designated as an interrupt reserved cache line and that the cache line has a shared (S) coherency state.

Data 644 indicates that an ISR vector and corresponding ISR data are stored in a block of memory beginning at system memory address M1. In other words, the data stored in system memory address M1 may include one or more pointers or interrupt vectors to the ISR(s) associated with I/O device 640. For compatibility with conventional MSI implementations, the format, including the number of bytes, permitted to represent the interrupt vector(s) may be a predetermined and relatively small number of bytes, for example, the minimum number of bytes required to point system 600 to the applicable ISR(s). The memory locations that follow the interrupt vector(s) may store information from the portion of data 644 described as the ISR data.

During operation, I/O device 640 may initiate an interrupt by writing the ISR vector information into guest physical memory address G1 and by writing data that the applicable ISR may use during execution in the memory locations subsequent to G1. In some embodiments, writing of both the ISR vector and ISR data to trigger an emulated MSI may be accomplished through one single memory burst write operation by I/O device 640. For example, if I/O device 640 is a disk drive initiating an interrupt to transfer data stored in a disk to system memory, the applicable ISR may require data indicating where the data to be transferred is stored on disk and where in system memory the transferred data is to be stored. These parameters may be provided by I/O device 640 when it initiates the interrupt by posting the needed values into system memory starting at a GPA corresponding to system memory address M1+N where N is the number of bytes specified for the interrupt vector(s). Because the described MSI handling techniques leverage the system's cache coherency infrastructure, the amount of ISR data that can be provided via an MSI as described herein may be defined by or limited to the number of bytes in a line of the applicable cache memory. If, for example, P1 cache 610-1 employs 64 byte cache lines, the amount of data that I/O device 640 may include with the MSI may be limited by this constraint.

Furthermore, guest physical memory address G1 has been written to an interrupt DMA address queue for I/O device 640, and an entry has been stored in a VM to interrupt cache line mapping table to indicate the association of a VM to which I/O device 640 has been assigned and the interrupt reserved cache lines.

Figure 7:
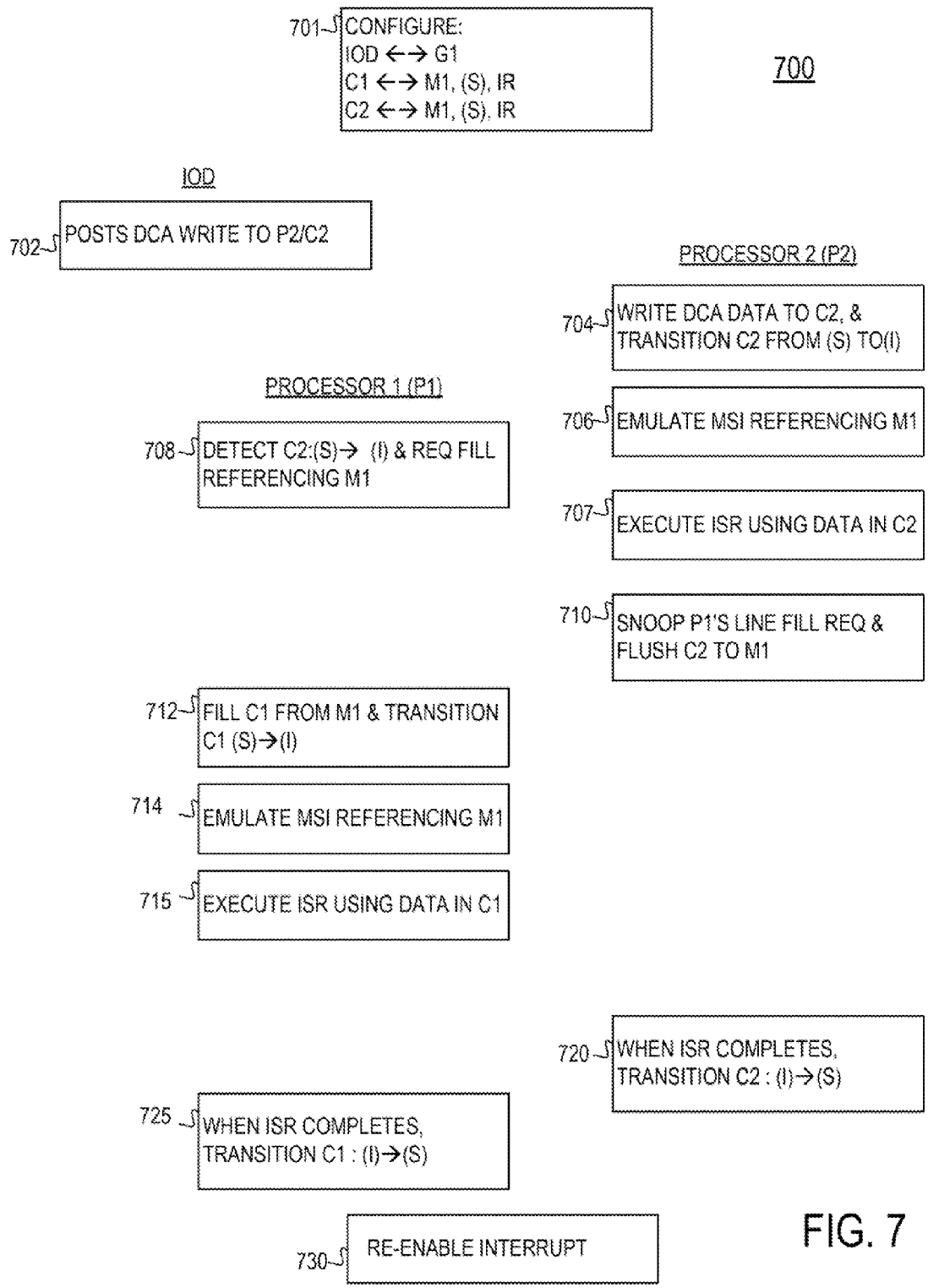
FIG. 7 illustrates events in the processing of MSIs according to one embodiment.

Referring to FIG. 7, selected elements of an event sequence 700 are depicted to illustrate selected features of cache-leveraged MSI handling in a multiprocessor environment. The FIG. 7 event sequence 700 includes configuring (operation 701) the applicable multiprocessor system with the multiprocessor MSI data 641, 642, 643, and 644 indicated in FIG. 6. Thus, as depicted in operation 701, the guest physical memory address assigned to I/O device 640 is G1, cache line C1 of processor P1 has been allocated as an interrupt reserved line, mapped to M1, and transitioned to a shared (S) coherency state. Similarly cache line C2 of processor P2 has also been allocated as an interrupt reserved line, mapped to M1, and forced into the shared state (S). For the sake of clarity, event sequence 700 will be described with reference to system 600 depicted in FIG. 6 and its corresponding elements. Sequence 700 is, however, suitable for other multiprocessor system architectures and platforms including the FIG. 1 multiprocessor system 100. The described sequence is illustrative and not exhaustive and other sequences may invoke the functionality described. For example, the FIG. 7 sequence 700 continues when I/O device 640 initiates an interrupt with a write transaction that references a GPA that is translated to an HPA address that is snooped by P2 cache 610-2, but the sequence could equally well have been initiated with a write transaction referencing a GPA that is translated to an HPA that is snooped by P1 cache 610-1.

The FIG. 7 sequence 700 takes advantage of DCA capabilities of system 700 and includes I/O device 640 initiating (operation 702) an MSI by posting a DCA write transaction referencing a GPA that is translated to an HPA corresponding to C2, which is the address of the cache line in P2 cache 610-2 that has been reserved for interrupts from I/O device 640 and mapped to system memory address M1. Systems that support DCA record and monitor associations between DCA addresses and their corresponding system memory addresses. The DCA write transaction posted by I/O device 640 includes write data referred to herein as the posted write data. In the context of MSI processing, the posted write data may include an ISR vector and emulated interrupt data as described above with respect to FIG. 4 and FIG. 5.

When processor P2 receives the DCA write transaction addressed to C2, P2 will write (operation 704) the posted write data contained in the DCA write transaction to cache line address C2 and transition a coherency state of cache line C2 from the shared state (S) to the in-use state (I). Because P2 cache 610-2 recognizes cache line C2 as an interrupt reserved cache line, the transition from the shared state (S) to the (I) state causes a P2 cache controller to emulate (block 706) an MSI by invoking an interrupt controller (not depicted) to execute (block 707) the ISR indicated in the ISR vector in the posted write data, where the ISR is the ISR corresponding to the VM indicated by the VM to interrupt cache line mapping table and which may be specific to P2 and/or may use data that is specific to P2. It should be noted that, even though the I/O device initiated the MSI using a DCA to a cache line that is mapped to system memory address M1, M1 cannot be assumed to have valid data until the contents of the cache line addressed by the DCA are flushed to system memory.

Cache decode logic of P1 cache 610-1 will detect (operation 708) the transition of a cache line that has or had a shared copy of a cache line (C1) that the P1 cache also holds in a shared state (S) and P1 will respond by issuing a line fill request that references system memory address M1. When P1 issues the line fill request, cache decode logic of P2 cache 610-2 will snoop the reference to M1 in the request and P2 processor 601-2 may flush (operation 710) the data in C2 to system memory location M1 in a manner analogous to the manner in which a modified cache line is flushed to system memory when a second processing element requests data from the same memory location.

Once C2 has been flushed to M1, the fill request from P1 cache 610-1 is filled, the coherency state of C1 transitions (operation 712) from the shared state (S) to the in-use state (I). P1 responds to receiving the line fill by initiating an emulated MSI (operation 714) referencing M1. As a result of emulating an MSI that references M1, P1 accesses C1 for the interrupt vector(s) and for emulated interrupt data and executes (operation 715) the applicable ISR, where the ISR is the ISR corresponding to the VM indicated by the VM to interrupt cache line mapping table and which may be specific to P1 and/or may use data that is specific to P1.

After P1 fills C1 with the emulated interrupt data from system memory, transitions to the in-use state (I), and triggers an emulated MSI to P1, both C1 and C2 end up in the same in-use state (I). If a third processor (P3) with cache line C3 is mapped to M1 in the same manner as C1 and C2, P3's snooping logic will also detect the DCA write to C2 and initiate a memory data fetch in the same manner as the P1 processor, i.e., retrieve the emulated interrupt data from system memory, transition C3 to the in-use state (I) and trigger an emulated MSI for P3. A processor cache line that has transitioned to in-use state (I) will remain the in the in-use state (I) until the applicable processor is done executing the ISR associated with the cache line interrupt information. Once all applicable interrupts have been serviced, the cache controllers may transition (operations 720, 725) the state of the applicable caches lines (C1, C2) from the in-use state (I) to the shared state (S) in preparation to intercept future interrupts, and memory address G1 may be pushed back into the I/O device's interrupt DMA address queue to re-enable the interrupt (operation 730).

In at least one embodiment, interrupt reserved cache line C1 of processor P1 601-1 may obtain interrupt vector(s) and emulated interrupt data directly from interrupt reserved cache line C2 of processor P2 601-2 without obtaining the same interrupt vectors(s) and emulated interrupt data from system memory. For this case, processor P2 may proactively forward interrupt vector(s) and emulated interrupt data from its interrupt reserved cache line C2 to interrupt reserved cache line C1 of processor P1 in response to a snoop hit to P1's data fetch request. Thus, the processor that receives the original DCA write, processor P2 in the sequence described above, responds to memory data fetch requests from all other processors as its reserve cache line (C2) contains the latest interrupt vector(s) and emulated interrupt data.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk re-writables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A processor, comprising:
   a first processing core; and
   a first cache memory associated with the first processing core, the first cache memory including:
   a plurality of cache lines; and
   a cache controller to:
      identify a first cache line as an interrupt reserved cache line by setting an interrupt reserved bit in a status field of the first cache line;
      map the first cache line to a host physical memory address;
      set a coherency state of the first cache line to shared; and
      emulate a first message signaled interrupt identifying the host physical memory address responsive to detecting an I/O transaction including I/O data from an I/O device assigned to a virtual machine and the I/O transaction including a reference to the host physical memory address, the host physical memory address translated from a guest physical memory address in an address space of the virtual machine.

2. The processor of claim 1, wherein the I/O transaction is a direct cache access transaction to the first cache memory and the reference to the host physical memory address comprises an address, indicated in the I/O transaction, of the first cache line.

3. The processor of claim 1, wherein the I/O transaction is a direct cache access transaction to a second cache memory of a second core, detecting the I/O transaction comprises snooping the I/O transaction, and the reference to the host physical memory address comprises an address of a second cache line, in the second cache memory, mapped to the memory address and shared with the first cache line.

4. The processor of claim 3, wherein the cache controller generates a line fill request referencing the host physical memory address responsive to snooping the I/O transaction and emulates the message signaled interrupt responsive to receiving the line fill.

5. The processor of claim 4, wherein the second core initiates a flush of the second cache line responsive to snooping the line fill request and wherein the line fill request awaits completion of the flush.

6. The processor of claim 1, wherein the I/O transaction comprises a direct memory access transaction to the host physical memory address and wherein detecting the I/O transaction comprises snooping the I/O transaction.

7. The processor of claim 6, wherein the cache controller generates a line fill request referencing the host physical memory address responsive to snooping the I/O transaction and emulates the message signaled interrupt responsive to receiving the line fill.

8. The processor of claim 1, wherein the cache controller emulates the first message signaled interrupt responsive the I/O data being written into the first cache line.

9. The processor of claim 8, wherein the cache controller transitions the coherency state of the first cache line to an in-use coherency state, wherein the in-use coherency state indicates that an interrupt service routine corresponding to the emulated message signaled interrupt is executing.

10. The processor of claim 9, wherein the I/O data includes an interrupt service routine vector and emulated interrupt data, wherein the interrupt service routine vector identifies an interrupt service routine and wherein the interrupt service routine, when executing, determines which of a plurality of processors is executing and accesses the emulated interrupt data.

11. The processor of claim 10, wherein the emulated interrupt data includes a first portion and a second portion and wherein the interrupt service routine accesses the first portion when executed by the first core and the interrupt service routine accesses the second portion when executed by a second core.

12. The processor of claim 11, wherein the interrupt service routine performs a first function when executed by the first core and a second function, different than the first function, when executed by the second core.

13. The processor of claim 11, wherein the interrupt service routine performs a function based on input data and wherein the first portion and the second portion indicate different input data.

14. An interrupt handling method, comprising:
  assigning an I/O device to a virtual machine;
  associating a guest physical memory address with the I/O device in a multiprocessor system, the guest physical address space in an address space of the virtual machine;
  reserving a first cache line of a first cache memory of a first processor for interrupt handling by setting an interrupt reserved bit in a status field of the first cache line and mapping the first cache line to a host physical memory address;
  reserving a second cache line of a second cache memory of a second processor for interrupt handling and mapping the second cache line to the host physical memory address;
  mapping the guest physical memory address to the host physical memory address;
  initializing a coherency state of the first cache line and the second cache line to a shared coherency state;
  responsive to detecting an I/O transaction containing I/O data from the I/O device and indicating a target address selected from: a direct address of the first cache line, a direct address of the second cache line, and the host physical memory address:
  storing I/O data in the host physical memory address, the first cache line, and the second cache line;
  emulating, by the first processor, a first emulated MSI referencing the host physical memory address responsive to storing the I/O data in the first cache line; and
  emulating, by the second processor, a second emulated MSI referencing the host physical memory address responsive to storing the I/O data in the second cache line.

15. The method of claim 14, wherein the I/O transaction comprises a direct memory address write transaction and the target address is the host physical memory address.

16. The method of claim 14, wherein the I/O transaction comprises a direct cache address write transaction and the target address is the direct address of the first cache line.

17. The method of claim 14, wherein the I/O data comprises posted write data, wherein the posted write data includes an interrupt service routine vector and emulated interrupt data, wherein the interrupt service routine vector indicates an interrupt service routine executed in response to an emulated MSI interrupt referencing the host physical memory address.

18. The method of claim 17, wherein the emulated interrupt data includes a first portion and a second portion and wherein the interrupt service routine accesses the first portion when executed by the first processor and wherein the interrupt service routine accesses the second portion when executed by the second processor.

19. The method of claim 18, wherein the interrupt service routine performs a first function when executed by the first processor and a second function, different than the first function, when executed by the second processor.

20. The system of claim 19, wherein the I/O data includes an interrupt service routine vector identifying an interrupt service routine and emulated interrupt data accessed by the interrupt service routine to influence the execution of the interrupt service routine.

21. The system of claim 20, wherein the emulated interrupt data includes a first portion accessed by the interrupt service routine during execution by the first core and a second portion accessed by the interrupt service routine during execution by the second core.

22. The method of claim 18, wherein the interrupt service routine performs a function based on input data and wherein the first portion and the second portion indicate different input data.

23. A computer system, comprising:
  a circuit to translate a guest physical memory address to a host physical memory address, the guest physical memory address in an address space of a virtual machine;
  an I/O device to be assigned to the virtual machine; and
  a processor including:
  a first processing core; and
  a first cache memory associated with the first processing core, the first cache memory including:
  a plurality of cache lines; and
  a cache controller to:
    identify a first cache line as an interrupt reserved cache line by setting an interrupt reserved bit in a status field of the first cache line;
    map the first cache line to the host physical memory address;
    set a coherency state of the first cache line to shared; and
    emulate a first message signaled interrupt identifying the host physical memory address responsive to detecting an I/O transaction including I/O data from the I/O device and the I/O transaction including a reference to the host physical memory address.

24. The system of claim 23, wherein the detecting of the I/O transaction comprises receiving a direct cache access from the I/O device and wherein the reference to the host physical memory address comprises a direct address of the first cache line.

25. The system of claim 23, wherein detecting the I/O transaction comprises snooping an I/O device direct cache access transaction to a second core of the processor and wherein the reference to the memory address comprises a direct address of a second cache line of a second cache memory, wherein the second cache line is reserved for interrupt handling and the processor maps to the memory address.

26. The system of claim 23, wherein detecting the I/O transaction comprises snooping an I/O device direct memory access transaction addressing the host physical memory address.

\* \* \* \* \*